United States Patent
Balfour et al.

(10) Patent No.: US 7,462,662 B2
(45) Date of Patent: Dec. 9, 2008

(54) FIRE-RETARDED POLYCARBONATE RESIN COMPOSITION

(75) Inventors: Kim G. Balfour, Delanson, NY (US); Christian Lietzau, Delmar, NY (US)

(73) Assignee: SABIC Innovative Plastics IP B.V., Pittsfield, MA (US)

( * ) Notice: Subject to any disclaimer, the term of this patent is extended or adjusted under 35 U.S.C. 154(b) by 267 days.

(21) Appl. No.: 10/888,422

(22) Filed: Jul. 9, 2004

(65) Prior Publication Data

US 2005/0009969 A1  Jan. 13, 2005

Related U.S. Application Data

(60) Provisional application No. 60/486,074, filed on Jul. 10, 2003.

(51) Int. Cl.
*B01D 63/06* (2006.01)
*C08K 3/34* (2006.01)

(52) U.S. Cl. .................. 524/165; 524/157; 524/451

(58) Field of Classification Search .............. 524/157, 524/165, 451
See application file for complete search history.

(56) References Cited

U.S. PATENT DOCUMENTS

| | | |
|---|---|---|
| 3,030,331 A | 4/1962 | Goldberg |
| 3,169,121 A | 2/1965 | Goldberg |
| 3,775,367 A | 11/1973 | Krefeld |
| 3,971,756 A | 7/1976 | Bialous et al. |
| 4,028,297 A | 6/1977 | Webb |
| 4,110,299 A | 8/1978 | Mark |
| 4,130,530 A | 12/1978 | Mark et al. |
| 4,130,548 A | 12/1978 | Kochanowski |
| 4,286,083 A | 8/1981 | Kochanowski |
| 4,303,575 A | 12/1981 | Reinert |
| 4,335,038 A | 6/1982 | Thomas |
| 4,552,704 A | 11/1985 | Mark |
| 4,552,911 A | 11/1985 | Cohnen et al. |
| 4,916,194 A | 4/1990 | Policastro et al. |
| 5,210,268 A | 5/1993 | Fukuoka et al. |
| 5,218,027 A | 6/1993 | Smith et al. |
| 5,508,323 A | 4/1996 | Romenesko et al. |
| 5,606,007 A | 2/1997 | Sakashita et al. |
| 6,308,142 B1 | 10/2001 | Choate et al. |
| 6,790,887 B1 * | 9/2004 | Nishihara ........... 524/120 |

FOREIGN PATENT DOCUMENTS

| | | |
|---|---|---|
| JP | 11181255 | 7/1999 |
| JP | 2001031854 A | 2/2001 |
| JP | 2003 049077 | 2/2003 |
| JP | 2003105184 A | 4/2003 |

* cited by examiner

*Primary Examiner*—Edward J Cain

(57) ABSTRACT

Improved fire-retarded properties can be imparted to fiber reinforced polycarbonate resin composition by incorporating into the polycarbonate an effective flame-retardant amount of a combination of perfluoroalkane sulfonate and talc.

22 Claims, No Drawings

FIRE-RETARDED POLYCARBONATE RESIN COMPOSITION

CROSS REFERENCE TO RELATED APPLICATION

This application claims the benefit of U.S. Provisional Application Ser. No. 60/486,074, filed Jul. 10, 2003.

FIELD OF THE INVENTION

This application relates to a fire-retarded polycarbonate resin composition.

BACKGROUND OF THE INVENTION

Because of their strength and clarity, polycarbonate resins have a great many significant commercial applications. Unfortunately, polycarbonate resins are inherently flammable and can drip hot molten material causing nearby materials to catch fire as well. Thus, in a number of applications employing polycarbonate blends, it may be desirable to include additives which retard the flammability of the material and/or which reduce dripping. The challenge is to identify additives which accomplish this purpose without compromising the desirable properties of strength and clarity, without introducing new problems (such as the potential environmental problems associated with halogenated additives) and without prohibitively increasing the price.

A variety of different materials have been described for use in producing fire-retarded and/or drip-resistant polycarbonates. Exemplary of these are the materials described in U.S. Pat. Nos. 3,971,756, 4,028,297, 4,110,299, 4,130,530, 4,303,575, 4,335,038, 4,552,911, 4,916,194, 5,218,027 and 5,508,323. Notwithstanding these varied disclosures, however, there remains room for improvement in the formulation of fire-retarded polycarbonate resin.

Achieving flame-retardant resin properties sufficient for obtaining an Underwriter's Laboratories listing is a prerequisite for many commercial applications of thermoplastic resins. To achieve listings of UL94 V-1 and or UL94 V-0 at the desired thicknesses ($\leq 2.5$ mm), several known flame retardants can be used. But in addition to adding cost, they have other disadvantages compared to non-flame retarded compositions. For example, the use of brominated compounds would preclude a resin from use in applications where conformance with TCO'99 guidelines (non-halogen) is desired. Other regulations or customer preferences may preclude the use of elemental (red) phosphorous or organic phosphates and phosphites. In addition, organic phosphates and phosphites reduce the deflection temperature under load (heat distortion temperature) of polycarbonate (PC)-resins and—because they are low molecular weight compounds—can form undesirable deposits on injection molding tools or the part surface, which in turn can lead to chemical stress cracking. Melamine cyanurates or inorganic hydrates (like aluminum trihydrate—ATH) cannot be incorporated effectively into resins requiring high processing temperatures due to the onset of their own thermal decomposition in that temperature range and typically reduce impact resistance significantly due to their particulate nature. These constraints are even more important in fiber reinforced composites, because these typically require larger amounts of flame retardant or more effective/costly ones to achieve UL94 V-1 or even UL94 V-0 listings.

Among the additives which are widely used commercially in fire-retarded polycarbonate resin compositions are organic salts, particularly sulfonic acid salts. Particular examples of these salts are perfluoroalkane sulfonates, such as potassium perfluorobutane sulfonate ("PFBS", also known as "Rimar salt" and potassium diphenylsulfone sulfonate ("KSS"), which may yield haze free compositions when blended with polycarbonate resin. The use of perfluoroalkane sulfonates in polycarbonate resins is described in U.S. Pat. No. 3,775,367. However, the benefits which can be obtained using these materials alone are limited and indeed additional additives are generally included.

Besides perfluorinated salts such as "Rimar Salt" (potassium perfluorobutane sulfonate, PFBS), organo-silicones may be used to help solve the above stated problems. However, like the above mentioned flame retardant (FR-) technologies, their efficiency (concentration required for V-0 or V-1 capability at a given thickness) is greatly reduced in fiber reinforced polycarbonate (PC) compositions, leading to increased cost and secondary effects of the FR such as reduced hydrolytic stability in the case of Rimar Salt, decreasing modulus and heat distortion temperature in the case of the organo-silicone. Organo-/nano-clays have also been demonstrated to have a beneficial effect on the FR-properties; however, most nano-clays commercially available today contain highly basic organic moieties which degrade the molecular weight of PC to the point of making the nano-clays practically not usable in PC.

There is still a need for an alternative to the above mentioned flame retardant technologies.

SUMMARY OF THE INVENTION

The invention, in one embodiment, relates to a fiber reinforced polycarbonate resin composition with a fire-retardant component comprising a perfluoroalkane sulfonate, such as potassium perfluorobutane sulfonate, and talc as particulate filler.

In one embodiment, the invention relates to a fiber-reinforced polycarbonate composition in which a flame retardant such as perfluoroalkane sulfonate is present in an amount of from 0 to 5 pbw (parts by weight) relative to the composition as a whole, and the talc filler is present in an amount of about 0.05 to about 10 pbw relative to the composition as a whole.

DETAILED DESCRIPTION OF THE INVENTION

The present invention relates to fire-retarded compositions comprising polycarbonate resin.

Applicants have found that the incorporation of an effective, flame-retardant amount of talc surprisingly reduces the flame-out time of a polycarbonate composition, even without any flame retardant component being present.

A sufficient level, or an effective, flame-retardant amount is one that increases the flame-resistant properties of the polycarbonate, as compared to an otherwise identical composition without the addition of the material to be added, e.g., the talc.

In one embodiment of a polycarbonate composition with a flame retardant component, e.g., commercially available materials such as perfluoroalkane sulfonates, brominated compounds, organic phosphate compounds, etc., the incorporation of an effective, flame-retardant amount of talc further reduces flame-out time of the composition.

In yet another embodiment of a reinforced polycarbonate composition with or without any flame retardant component, the talc surprisingly imparts fire-retardant properties to the composition, e.g., rendering the composition a flame rating of V-0 or V-1 in the Underwriter's laboratory UL-94 protocol when measured on a test specimen of about 0.062 inch by about 0.5 inch by about 5 inch dimensions.

In a fourth embodiment of a reinforced polycarbonate composition with a perfluoroalkane sulfonate as the main flame retardant component, the talc surprisingly helps impart improved fire-retardant properties to the composition by rendering the composition a flame rating of V-0 or V-1 in the Underwriter's laboratory UL-94 protocol when measured on a test specimen of about 0.062 inch by about 0.5 inch by about 5 inch dimensions.

The polycarbonate (PC) component of the compositions may be of any grade and made by any method. Thus, for example, the polycarbonate may be made via interfacial processes or by catalytic transesterification. The polycarbonate may be either branched or linear in structure, and may include functional substituents. Polycarbonate copolymers are also included within the invention. Techniques for manufacture of polycarbonates by these processes are well known, for example from U.S. Pat. Nos. 3,030,331, 3,169,121, 4,130,548, 4,286,083, 4,552,704, 5,210,268 and 5,606,007. In one embodiment, the polycarbonate is one which can be characterized as having high melt strength, i.e. a melt strength of at least $R^*=1.8$. $R^*$ is the viscosity ratio at 1 rad/s and at 100 rad/s measured at a temperature when the viscosity at 100 rad/s is equal to 20,000 poise. High melt strength can be an inherent property of the polycarbonate, for example as a result of a branched polycarbonate structure, or can be achieved through the addition of an anti-drip agent.

Once the polycarbonate resin is prepared, it is compounded with a fire-retardant component. In one embodiment of the invention, the fire retardant component comprises a perfluoroalkane sulfonate and a suitable filler. An embodiment of perfluoroalkane sulfonates useful in the invention is described in U.S. Pat. No. 3,775,367. In one embodiment, the perfluoroalkane sulfonate is a potassium perfluorobutane sulfonate (also known as "Rimar salt"), which is commercially available from multiple sources.

In one embodiment, the perfluoroalkane sulfonate is incorporated at a level sufficient to impart fire-retardant properties to the polycarobonate. In a second embodiment, the amount of perfluoroalkane ranges from 0.05 up to 0.5 parts by weight ("pbw"), based on the total weight of the composition. In a third embodiment, the perfluoroalkane sulfonate is present in an amount of up to 1 pbw. In a fourth embodiment, the amount is about 0.05 to 5 pbw.

Applicants have found that the addition of an effective flame-retardant amount of talc to a polycarbonate glass composition with or without a flame retardant, a reinforced polycarbonate composition with or without a flame retardant such as perfluoroalkane sulfonate, significantly and unexpectedly reduces flame-out-times in the UL94 vertical burn test, leading to V-0 or V-1 capability.

In one embodiment of a polycarbonate or reinforced polycarbonate composition with a flame retardant material such as Rimar Salt, the incorporation of an effective, flame-retardant amount of talc helps reduce the concentration of the amount of the flame retardant component for cost savings measures.

In one embodiment of the invention, talc has an average particle size of 0.1 to 15 μm. In a second embodiment, it has a size of about 0.2 to 10 μm. In a third embodiment, talc has a size of about 0.2 to 7 μm.

In one embodiment of the invention, the sufficient level of talc is about 0.1 to 20 pbw, based on the total weight of the composition. In a second embodiment, talc is added in an amount of about 0.5 to 15 pbw. In a third embodiment, talc is added in an amount of about 0.5 to 10 pbw. In a third embodiment, the amount of talc added is about 0.1 to 5 pbw. In a fourth embodiment, the talc may be added to the polycarbonate in a ratio of about 0.1 to 10 parts by weight.

The compositions of the invention may include reinforcing fibers such as glass and carbon fibers. In one embodiment of the invention, reinforcing fibers are incorporated in an amount of up to 30 parts by weight. In a second embodiment, in an amount of up to 20 parts by weight. In a third embodiment, in an amount of up to 10 parts by weight.

Additionally, any of various kinds of additives, other kinds of synthetic resins or elastomers can be mixed in the resin composition of the present invention according to necessity to the extent that such mixing does not impair the object of the present invention. Other conventional additives which are known in the art for inclusion in polycarbonate compositions include but are not limited to additives such as hindered phenol antioxidants, esters of phosphorous acid, esters of phosphoric acid and amines; ultraviolet absorbents such as benzotriazoles and benzophenones; light stabilizers such as hindered amines; internal lubricants such as aliphatic carboxylic acid esters, paraffin, silicone oil and polyethylene wax; and flame retardants, flame retarding aid, mold release agents, antistatic agents, coloring agents and the like of conventional typesstabilizers, mold release agents, light stabilizers, heat stabilizers, pigments and dyes.

In the compositions of the invention, any of various kinds of additives, other kinds of synthetic resins or elastomers can be mixed in the resin composition of the present invention according to necessity to the extent that such mixing does not impair the object of the present invention.

The compositions according to the present invention can be prepared by compounding the above-mentioned components, i.e., polycarbonate, talc, perfluoroalkane sulfonate, optional fiber, and, as necessary, any of the aforesaid additives in respective prescribed proportions and kneading the resultant compound. The talc may also be added to the polycarbonate in combination, for example as a fire-retardant additive composition comprising a perfluoroalkane sulfonate and the talc filler, or sequentially in either order.

In one embodiment of the invention, the polycarbonate blend comprises a BPA-PC with an MFI (300, 1.2 kg) between 3 and 100 g/10 min, a reduced (compared to the requirements of a composition containing no talc) amount of potassium perfluorobutane sulfonate (PFBS, "Rimar Salt") or other perfluorinated organic salts known in the art, talc as a particulate filler (d=0.1-20 μm, more preferably d<7 μm), mica, clay, fibrous reinforcement: glass fiber (d=3-25 μm, more preferably d=10-17 μm), carbon fiber which may be made by melt spinning of mesophase pitch or carbonization of PAN fibers or other processes (d=3-25 μm, more preferably d=5-12 μm), optional materials such as wollastonite or other fibrous reinforcements, PTFE or other anti-drip agents.

The compounding and the kneading of the blend can be carried out by using any of conventional methods, for example, the method using a ribbon blender, a Henschel mixer, a Banbury mixer, a drum tumbler, a single-screw extruder, a twin-screw extruder, a co kneader, a multi-screw extruder or the like. The temperature during the kneading is usually selected in the range of 240° to 300° C. After extruding, the compound may be molded in parts of desired shapes.

While the specific method for testing for flame-retardant properties is not critical, one common method that may be employed involves the formation of bars molded from extruded polycarbonate and tested using the standard Underwriters Laboratory UL 94 test method. Flame-out-times may be as analyzed and described in U.S. Pat. No. 6,308,142 B1. Generally, the data may be analyzed by calculation of the average flame out time (avFOTsec), standard deviation of the flame out time (sdFOTsec) and the total number of drips, and using statistical methods to convert that data to a prediction of the probability of first time pass, or "p(FTP)" or "PFTP," meaning that a particular sample formulation would achieve a V0 "pass" rating in the conventional UL94 testing of 5 bars. Preferably p(FTP) will be as close to 1 as possible, for example greater than 0.9 and more preferably greater than 0.95, for maximum flame-retardant performance in UL Testing.

The invention will now be further described by way of the following, non-limiting examples.

EXAMPLES

Polycarbonate resin powder was blended with the additives shown in Table 1-3 and extruded in a Werner & Pfleiderer co-rotating twin-screw extruder using the processing parameters shown below. Glass fiber or carbon fiber was added downstream to the extruder at the concentrations also shown in Tables 1-3 using a gravimetric feeder and a side stuffer. The extruded strands were cooled in a water bath and pelletized using rotating knife pelletizers.

The resulting pellets were dried 2-4 hours at 120° C. in a desiccating convection oven and injection molded on an 85 Ton VanDorn molding machine into 1.5 mm-thick flame bars (0.5" wide×5" long) using the injection molding conditions shown below. The injection molded flame bars were conditioned for 24 hours in a standard lab atmosphere (23° C., 50% R.H.) and subsequently tested according to the UL94 vertical burn test protocol. Flame-out-times were recorded and analyzed. The results of these analyses are also shown in Tables 1-3.

The compounding conditions in the experiments are as follows:

| | | | |
|---|---|---|---|
| Temperature Zone 1 | 220° C.; | Temperature Zone 2 | 250° C. |
| Temperature Zone 3 | 280° C.; | Temperature Zone 4 | 300° C. |
| Temperature Zone 5 | 300° C.; | Temperature Die Zone | 300° C. |
| Screw Speed [rpm] | 300; | Total Feed Rate [lbs/h] | 40 |

The injection molding conditions for the experiments are as follows:

| | | | |
|---|---|---|---|
| Temperature Zone 1 | 540° F.; | Temperature Zone 2 | 560° F. |
| Temperature Zone 3 | 580° F.; | Temperature Die Zone | 580° F. |
| Mold Temperature | 190° F.; | Injection Speed [in/s] | 1.0 |
| Screw Speed [rpm] | 50; | Pressure [psig] | 50 |
| Time [s] | 60. | | |

The materials used in the experiments are as follows:

| Generic Raw Material Description | CAS-No. | Function |
|---|---|---|
| potassium diphenyl sulfone sulfonate | 63316-43-8 | Anti-drip/FR |
| potassium perfluorobutane sulfonate | 29420-49-3 | FR |
| SAN-encapsulated PTFE (50% PTFE) | 9002-84-0 | Anti-drip |
| pentaerythritol tetrastearate | 115-83-3 | Mold Release |
| tris(2,4-di-t-butylphenyl) phosphite | 31570-04-4 | Antioxidant |

-continued

| Generic Raw Material Description | CAS-No. | Function |
|---|---|---|
| Hindered phenol antioxidant | 2082-79-3 | Antioxidant |
| carbon fiber (Grade A) | 70892-43-2/7440-40-4 | Reinforcement |
| Talc | 14807-96-6 | Mineral/FR |
| carbon fiber (Grade B) | 70892-43-2/7440-40-4 | Reinforcement |
| Bis-phenol A polycarbonate, MFI: 20 | 111211-39-2 | Resin |
| Bis-phenol A polycarbonate, MFI: 5 | 111211-39-3 | Resin |
| Bis-phenol A polycarbonate, MFI: 30 | 111211-39-3 | Resin |
| glass fiber | 65997-17-3 | Reinforcement |

In the examples, "PFTP" refers to the "probability of first test pass for a UL94 V-0 listing at 1.5 mm", PFBS refers to potassium perfluorobutane sulfonate; KSS refers to potassium dipheny sulfone sulfonate, and PC refers to bisphenol-A polycarbonate. Other acronyms used in the following are as explained above in the section testing flame retardant properties.

Table 1a shows several examples of carbon fiber reinforced PC without the FR-additives (0.6% of KSS or 0.1% PFBS). In none of the examples, the PFTP for a V-0 listing at 1.5 mm approaches commercial usefulness (defined here as ≧0.5) and are—in fact close to or equal 0.

Similarly, Table 1b shows examples of carbon fiber reinforced PC containing 1 or 2% talc, but no PFBS or KSS. These compositions (with the exceptions of the examples containing 5% carbon fiber) show PFTP's >0.5 even without PFBS or KSS in the formulation. By contrast, all of the examples in Table 1c, show carbon fiber reinforced PC compositions containing KSS and/or PFBS and talc have PFTP's ≧0.90.

Table 2a shows examples of PC reinforced with a different grade of carbon fiber and containing KSS and/or PFBS, but no talc. The PFTP's were close to or equal 0.

Table 2b shows examples of similarly carbon fiber reinforced PC and containing both 2% talc and/or KSS and/or PFBS. At a carbon fiber concentration of 10%, all of the PFTP's are ≧0.5.

Table 3a shows examples of 10% glass fiber reinforced PC with and without talc and with and without PFBS, but no compositions with a combination of both. Only the compositions containing the PFBS (examples 48 & 49) show PFTP's >0.5.

Table 3b shows examples of 10% glass fiber reinforced PC with talc and PFBS. All of the compositions, except example no. 57 have PFTP's >0.5. From the examples here, it appears that the KSS has a detrimental effect on PFTP in glass fiber reinforced PC compositions.

Table 3c shows examples of 20% glass fiber reinforced PC containing talc, but no PFBS. The PFTP's are close to or equal 0.

Table 3d shows examples of 20% glass fiber reinforced PC containing talc and PFBS. All of the compositions, except example no. 74 (which contained also KSS), had PFTP's >0.5.

Table 3e shows examples of 30% or 40% glass fiber reinforced PC containing different combinations of talc, PFBS and KSS. Example 81 (with PFBS, but without talc) had a PFTP of 0.57. On the other hand, example 80 (with talc and PFBS) shows a surprisingly good PFTP of 0.93. Compositions containing either no PFBS or did contain KSS, had PFTP's of 0.

TABLE 1a

Carbon fiber reinforced polycarbonate compositions containing no talc and statistics for UL94 vertical burn test results

| Materials/Examples | 1 | 2 | 3 | 4 | 5 | 6 | 7 |
|---|---|---|---|---|---|---|---|
| Bis-phenol A polycarbonate, MFI: 5 | 62.6 | 59.3 | 44.2 | 55.9 | 52.6 | 43.9 | 44.1 |
| Bis-phenol A polycarbonate, MFI: 30 | 31.3 | 29.6 | 44.2 | 28.0 | 26.3 | 43.9 | 44.2 |
| potassium diphenyl sulfone sulfonate | | | | | | 0.6 | |
| potassium perfluorobutane sulfonate | | | | | | | 0.1 |
| SAN-encapsulated PTFE (50% PTFE) | 0.5 | 0.5 | 1.0 | 0.5 | 0.5 | 1.0 | 1.0 |
| pentaerythritol tetrastearate | 0.5 | 0.5 | 0.5 | 0.5 | 0.5 | 0.5 | 0.5 |
| tris(2,4-di-t-butylphenyl)phosphite | 0.08 | 0.08 | 0.08 | 0.08 | 0.08 | 0.08 | 0.08 |
| Hindered phenol antioxidant | 0.02 | 0.02 | 0.02 | 0.02 | 0.02 | 0.02 | 0.02 |
| carbon fiber (Grade A) | 5 | 10 | 10 | 15 | 20 | 10 | 10 |
| UL94 Vertical Burn Property | | | | | | | |
| Avg[Log(1st FOT)] | 0.48 | 0.51 | 0.60 | 0.56 | 0.64 | 0.80 | 0.62 |
| StDev[Log(1st FOT)] | 0.35 | 0.33 | 0.32 | 0.25 | 0.25 | 0.24 | 0.27 |
| Avg[Log(2nd FOT)] | 0.69 | 0.59 | 0.82 | 0.65 | 0.85 | 0.88 | 0.87 |
| StDev[Log(2nd FOT)] | 0.45 | 0.30 | 0.28 | 0.29 | 0.26 | 0.28 | 0.18 |
| Drips | 0 | 0 | 0 | 0 | 0 | 0 | 0 |
| p(FTP) for V-0 | 0.06 | 0.30 | 0.02 | 0.24 | 0.01 | 0.00 | 0.01 |
| p(FTP) for V-1 | 0.81 | 0.98 | 0.94 | 0.99 | 0.96 | 0.91 | 0.99 |

TABLE 1b

Carbon fiber reinforced polycarbonate compositions containing talc, but no FR agent and statistics for UL94 vertical burn test results

| Materials/Examples | 8 | 9 | 10 | 11 | 12 | 13 | 14 | 15 |
|---|---|---|---|---|---|---|---|---|
| Bis-phenol A polycarbonate, MFI: 5 | 61.9 | 58.6 | 55.3 | 51.9 | 61.3 | 57.9 | 54.6 | 51.3 |
| Bis-phenol A polycarbonate, MFI: 30 | 31.0 | 29.3 | 27.6 | 26.0 | 30.6 | 29.0 | 27.3 | 25.6 |
| Talc | 1 | 1 | 1 | 1 | 2 | 2 | 2 | 2 |
| SAN-encapsulated PTFE (50% PTFE) | 0.5 | 0.5 | 0.5 | 0.5 | 0.5 | 0.5 | 0.5 | 0.5 |
| pentaerythritol tetrastearate | 0.5 | 0.5 | 0.5 | 0.5 | 0.5 | 0.5 | 0.5 | 0.5 |
| tris(2,4-di-t-butylphenyl)phosphite | 0.08 | 0.08 | 0.08 | 0.08 | 0.08 | 0.08 | 0.08 | 0.08 |
| Hindered phenol antioxidant | 0.02 | 0.02 | 0.02 | 0.02 | 0.02 | 0.02 | 0.02 | 0.02 |
| carbon fiber (Grade A) | 5 | 10 | 15 | 20 | 5 | 10 | 15 | 20 |
| UL94 Vertical Burn Property | | | | | | | | |
| Avg[Log(1st FOT)] | 0.26 | 0.55 | 0.61 | 0.51 | 0.30 | 0.33 | 0.36 | 0.44 |
| StDev[Log(1st FOT)] | 0.24 | 0.25 | 0.21 | 0.17 | 0.23 | 0.21 | 0.20 | 0.22 |
| Avg[Log(2nd FOT)] | 0.64 | 0.55 | 0.56 | 0.61 | 0.58 | 0.57 | 0.51 | 0.50 |
| StDev[Log(2nd FOT)] | 0.24 | 0.18 | 0.16 | 0.23 | 0.38 | 0.21 | 0.14 | 0.21 |
| Drips | 0 | 0 | 0 | 0 | 0 | 0 | 0 | 0 |
| p(FTP) for V-0 | 0.68 | 0.75 | 0.75 | 0.69 | 0.40 | 0.89 | 1.00 | 0.92 |
| p(FTP) for V-1 | 1.00 | 1.00 | 1.00 | 1.00 | 0.95 | 1.00 | 1.00 | 1.00 |

TABLE 1c

Carbon fiber reinforced polycarbonate compositions containing talc and FR-agent and statistics for UL94 vertical burn test results

| Materials/Examples | 16 | 17 | 18 | 19 | 20 | 21 |
|---|---|---|---|---|---|---|
| Bis-phenol A polycarbonate, MFI: 5 | 42.9 | 43.1 | 41.9 | 41.8 | 42.2 | 42.1 |
| Bis-phenol A polycarbonate, MFI: 30 | 42.9 | 43.2 | 41.9 | 41.9 | 42.2 | 42.2 |
| potassium diphenyl sulfone sulfonate | 0.6 | | 0.6 | 0.6 | | |
| potassium perfluorobutane sulfonate | | 0.1 | | 0.1 | | 0.1 |
| Talc | 2 | 2 | 4 | 4 | 4 | 4 |
| SAN-encapsulated PTFE (50% PTFE) | 1.0 | 1.0 | 1.0 | 1.0 | 1.0 | 1.0 |
| pentaerythritol tetrastearate | 0.5 | 0.5 | 0.5 | 0.5 | 0.5 | 0.5 |
| tris(2,4-di-t-butylphenyl)phosphite | 0.08 | 0.08 | 0.08 | 0.08 | 0.08 | 0.08 |
| Hindered phenol antioxidant | 0.02 | 0.02 | 0.02 | 0.02 | 0.02 | 0.02 |
| carbon fiber (Grade A) | 10 | 10 | 10 | 10 | 10 | 10 |
| UL94 Vertical Burn Property | | | | | | |
| Avg[Log(1st FOT)] | 0.42 | 0.17 | 0.27 | 0.28 | 0.11 | 0.14 |
| StDev[Log(1st FOT)] | 0.23 | 0.13 | 0.21 | 0.15 | 0.10 | 0.08 |
| Avg[Log(2nd FOT)] | 0.56 | 0.52 | 0.53 | 0.59 | 0.44 | 0.39 |
| StDev[Log(2nd FOT)] | 0.20 | 0.16 | 0.15 | 0.18 | 0.12 | 0.16 |
| Drips | 0 | 0 | 0 | 0 | 0 | 0 |

TABLE 1c-continued

Carbon fiber reinforced polycarbonate compositions containing talc and FR-agent and statistics for UL94 vertical burn test results

| Materials/Examples | 16 | 17 | 18 | 19 | 20 | 21 |
|---|---|---|---|---|---|---|
| p(FTP) for V-0 | 0.90 | 0.99 | 0.99 | 0.95 | 1.00 | 1.00 |
| p(FTP) for V-1 | 1.00 | 1.00 | 1.00 | 1.00 | 1.00 | 1.00 |

TABLE 2a

Carbon fiber reinforced polycarbonate compositions containing no talc and statistics for UL94 vertical burn test results

| Materials/Examples | 22 | 23 | 24 | 25 | 26 | 27 | 28 | 29 | 30 |
|---|---|---|---|---|---|---|---|---|---|
| Bis-phenol A polycarbonate, MFI: 20 | 88.9 |  | 88.3 |  | 88.8 |  | 88.2 | 83.55 | 78.9 |
| Bis-phenol A polycarbonate, MFI: 5 |  | 44.2 |  | 43.9 |  | 44.1 |  |  |  |
| Bis-phenol A polycarbonate, MFI: 30 |  | 44.2 |  | 43.9 |  | 44.2 |  |  |  |
| potassium diphenyl sulfone sulfonate |  |  | 0.6 | 0.6 |  |  | 0.6 | 0.3 |  |
| potassium perfluorobutane sulfonate |  |  |  |  | 0.1 | 0.1 | 0.1 | 0.05 |  |
| SAN-encapsulated PTFE (50% PTFE) | 0.5 | 1.0 | 0.5 | 1.0 | 0.5 | 1.0 | 0.5 | 0.5 | 0.5 |
| pentaerythritol tetrastearate | 0.5 | 0.5 | 0.5 | 0.5 | 0.5 | 0.5 | 0.5 | 0.5 | 0.5 |
| tris(2,4-di-t-butylphenyl)phosphite | 0.08 | 0.08 | 0.08 | 0.08 | 0.08 | 0.08 | 0.08 | 0.08 | 0.08 |
| Hindered phenol antioxidant | 0.02 | 0.02 | 0.02 | 0.02 | 0.02 | 0.02 | 0.02 | 0.02 | 0.02 |
| carbon fiber (Grade B) | 10 | 10 | 10 | 10 | 10 | 10 | 10 | 15 | 20 |
| UL94 Vertical Burn Property |  |  |  |  |  |  |  |  |  |
| Avg[Log(1st FOT)] | 0.68 | 0.64 | 0.79 | 0.73 | 0.38 | 0.53 | 0.74 | 0.70 | 0.76 |
| StDev[Log(1st FOT)] | 0.23 | 0.24 | 0.18 | 0.26 | 0.17 | 0.23 | 0.22 | 0.18 | 0.23 |
| Avg[Log(2nd FOT)] | 0.78 | 0.80 | 1.26 | 1.04 | 0.80 | 0.94 | 1.02 | 1.29 | 1.45 |
| StDev[Log(2nd FOT)] | 0.29 | 0.23 | 0.16 | 0.24 | 0.27 | 0.20 | 0.24 | 0.10 | 0.26 |
| Drips | 0 | 0 | 2 | 0 | 0 | 0 | 0 | 6 | 11 |
| p(FTP) for V-0 | 0.02 | 0.03 | 0.00 | 0.00 | 0.13 | 0.00 | 0.00 | 0.00 | 0.00 |
| p(FTP) for V-1 | 0.96 | 0.99 | 0.35 | 0.83 | 0.97 | 0.99 | 0.85 | 0.10 | 0.00 |

TABLE 2b

Carbon fiber reinforced polycarbonate compositions containing talc and FR agent(s) and statistics for UL94 vertical burn test results

| Materials/Examples | 31 | 32 | 33 | 34 | 35 | 36 | 37 | 38 |
|---|---|---|---|---|---|---|---|---|
| Bis-phenol A polycarbonate, MFI: 20 | 86.9 | 86.3 |  | 86.8 |  | 86.2 | 76.8 | 76.2 |
| Bis-phenol A polycarbonate, MFI: 5 |  |  | 42.9 |  | 43.1 |  |  |  |
| Bis-phenol A polycarbonate, MFI: 30 |  |  | 42.9 |  | 43.2 |  |  |  |
| potassium diphenyl sulfone sulfonate |  | 0.6 | 0.6 |  |  | 0.6 |  | 0.6 |
| potassium perfluorobutane sulfonate |  |  |  | 0.1 | 0.1 | 0.1 | 0.1 | 0.1 |
| Talc | 2 | 2 | 2 | 2 | 2 | 2 | 2 | 2 |
| SAN-encapsulated PTFE (50% PTFE) | 0.5 | 0.5 | 1.0 | 0.5 | 1.0 | 0.5 | 0.5 | 0.5 |
| pentaerythritol tetrastearate | 0.5 | 0.5 | 0.5 | 0.5 | 0.5 | 0.5 | 0.5 | 0.5 |
| tris(2,4-di-t-butylphenyl)phosphite | 0.08 | 0.08 | 0.08 | 0.08 | 0.08 | 0.08 | 0.08 | 0.08 |
| Hindered phenol antioxidant | 0.02 | 0.02 | 0.02 | 0.02 | 0.02 | 0.02 | 0.02 | 0.02 |
| carbon fiber (Grade B) | 10 | 10 | 10 | 10 | 10 | 10 | 20 | 20 |
| UL94 Vertical Burn Property |  |  |  |  |  |  |  |  |
| Avg[Log(1st FOT)] | 0.20 | 0.26 | 0.48 | 0.16 | 0.27 | 0.36 | 0.45 | 0.75 |
| StDev[Log(1st FOT)] | 0.13 | 0.16 | 0.16 | 0.13 | 0.12 | 0.17 | 0.15 | 0.22 |
| Avg[Log(2nd FOT)] | 0.62 | 0.61 | 0.71 | 0.48 | 0.60 | 0.72 | 1.07 | 1.27 |
| StDev[Log(2nd FOT)] | 0.32 | 0.20 | 0.20 | 0.13 | 0.16 | 0.14 | 0.12 | 0.13 |
| Drips | 0 | 0 | 0 | 0 | 0 | 0 | 0 | 2 |
| p(FTP) for V-0 | 0.50 | 0.87 | 0.51 | 1.00 | 0.97 | 0.84 | 0.00 | 0.00 |
| p(FTP) for V-1 | 0.98 | 1.00 | 1.00 | 1.00 | 1.00 | 1.00 | 1.00 | 0.43 |

TABLE 3a

10% Glass fiber reinforced polycarbonate compositions and statistics for UL94 vertical burn test result

| Materials/Examples | 39 | 40 | 41 | 42 | 43 | 44 | 45 | 46 | 47 | 48 | 49 |
|---|---|---|---|---|---|---|---|---|---|---|---|
| Bis-phenol A polycarbonate, MFI: 5 | 44.2 | 44.25 | 43.9 | 43.25 | 43.25 | 42.9 | 42.9 | 43.2 | 42.25 | 44.1 | 44 |
| Bis-phenol A polycarbonate, MFI: 30 | 44.2 | 44.25 | 43.9 | 43.25 | 43.25 | 42.9 | 42.9 | 43.2 | 42.25 | 44.2 | 44 |
| potassium diphenyl sulfone sulfonate |  |  | 0.6 |  |  | 0.6 | 0.6 |  |  |  |  |

TABLE 3a-continued

10% Glass fiber reinforced polycarbonate compositions and statistics for UL94 vertical burn test result

| Materials/Examples | 39 | 40 | 41 | 42 | 43 | 44 | 45 | 46 | 47 | 48 | 49 |
|---|---|---|---|---|---|---|---|---|---|---|---|
| potassium perfluorobutane sulfonate | | | | | | | | | | 0.1 | 0.1 |
| Talc | | | | 2 | 2 | 2 | 2 | 2 | 4 | | |
| SAN-encapsulated PTFE (50% PTFE) | 1 | 1 | 1 | 1 | 1 | 1 | 1 | 1 | 1 | 1 | 1 |
| pentaerythritol tetrastearate | 0.5 | 0.5 | 0.5 | 0.5 | 0.5 | 0.5 | 0.5 | 0.5 | 0.5 | 0.5 | 0.5 |
| tris(2,4-di-t-butylphenyl)phosphite | 0.08 | | 0.08 | | | 0.08 | 0.08 | 0.08 | | 0.08 | |
| Hindered phenol antioxidant | 0.02 | | 0.02 | | | 0.02 | 0.02 | 0.02 | | 0.02 | |
| carbon black | | | | | | | | | | | 0.5 |
| glass fiber | 10 | 10 | 10 | 10 | 10 | 10 | 10 | 10 | 10 | 10 | 10 |
| UL94 Vertical Burn Property | | | | | | | | | | | |
| Avg[Log(1st FOT)] | 0.75 | 0.43 | 0.80 | 0.39 | 0.45 | 0.27 | 0.11 | 0.15 | 0.38 | 0.46 | 0.07 |
| StDev[Log(1st FOT)] | 0.46 | 0.38 | 0.35 | 0.24 | 0.34 | 0.22 | 0.25 | 0.26 | 0.31 | 0.33 | 0.16 |
| Avg[Log(2nd FOT)] | 0.79 | 0.75 | 0.91 | 0.70 | 0.61 | 0.83 | 1.09 | 0.79 | 0.66 | 0.68 | 0.28 |
| StDev[Log(2nd FOT)] | 0.41 | 0.38 | 0.27 | 0.27 | 0.33 | 0.32 | 0.40 | 0.28 | 0.31 | 0.16 | 0.11 |
| Drips | 0 | 0 | 0 | 0 | 0 | 0 | 0 | 0 | 0 | 0 | 0 |
| p(FTP) for V-0 | 0.00 | 0.06 | 0.00 | 0.35 | 0.26 | 0.08 | 0.00 | 0.18 | 0.30 | 0.53 | 1.00 |
| p(FTP) for V-1 | 0.60 | 0.86 | 0.80 | 0.99 | 0.97 | 0.90 | 0.41 | 0.97 | 0.98 | 1.00 | 1.00 |

TABLE 3b

10% Glass fiber reinforced polycarbonate compositions and statistics for UL94 vertical burn test results (continued)

| Generic Raw Material Description | 50 | 51 | 52 | 53 | 54 | 55 | 56 | 57 | 58 |
|---|---|---|---|---|---|---|---|---|---|
| Bis-phenol A polycarbonate, MFI: 5 | 43.25 | 42.7 | 42.2 | 42.2 | 43.1 | 43.2 | 42.9 | 42.2 | 42.25 |
| Bis-phenol A polycarbonate, MFI: 30 | 43.25 | 42.7 | 42.2 | 42.2 | 43.2 | 43.2 | 42.9 | 42.2 | 42.25 |
| potassium diphenyl sulfone sulfonate | | | | | | | 0.6 | | |
| potassium perfluorobutane sulfonate | 0.05 | 0.05 | 0.05 | 0.05 | 0.1 | 0.1 | 0.1 | 0.1 | 0.5 |
| Talc | 2 | 3 | 4 | 4 | 2 | 2 | 2 | 4 | 3 |
| SAN-encapsulated PTFE (50% PTFE) | 1 | 1 | 1 | 1 | 1 | 1 | 1 | 1 | 1 |
| pentaerythritol tetrastearate | 0.5 | 0.5 | 0.5 | 0.5 | 0.5 | 0.5 | 0.5 | 0.5 | 0.5 |
| tris(2,4-di-t-butylphenyl)phosphite | | | | | 0.08 | | 0.08 | | |
| Hindered phenol antioxidant | | | | | 0.02 | | 0.02 | | |
| carbon black | | | | | | | | | 0.5 |
| glass fiber | 10 | 10 | 10 | 10 | 10 | 10 | 10 | 10 | 10 |
| UL94 Vertical Burn Property | | | | | | | | | |
| Avg[Log(1st FOT)] | 0.10 | 0.07 | 0.16 | 0.11 | 0.35 | 0.16 | 0.17 | 0.21 | 0.05 |
| StDev[Log(1st FOT)] | 0.20 | 0.08 | 0.16 | 0.13 | 0.31 | 0.25 | 0.16 | 0.28 | 0.11 |
| Avg[Log(2nd FOT)] | 0.34 | 0.31 | 0.31 | 0.54 | 0.55 | 0.35 | 0.90 | 0.49 | 0.17 |
| StDev[Log(2nd FOT)] | 0.12 | 0.08 | 0.12 | 0.22 | 0.16 | 0.11 | 0.25 | 0.41 | 0.12 |
| Drips | 0 | 0 | 0 | 0 | 0 | 0 | 0 | 0 | 0 |
| p(FTP) for V-0 | 1.00 | 1.00 | 1.00 | 0.92 | 0.89 | 1.00 | 0.05 | 0.51 | 1.00 |
| p(FTP) for V-1 | 1.00 | 1.00 | 1.00 | 1.00 | 1.00 | 1.00 | 0.95 | 0.96 | 1.00 |

TABLE 3c

20% Glass Fiber reinforced polycarbonate compositions containing talc, no FR agent and statistics for UL94 vertical burn test results

| Generic Raw Material Description | 59 | 60 | 61 | 62 | 63 | 64 |
|---|---|---|---|---|---|---|
| Bis-phenol A polycarbonate, MFI: 5 | 39.25 | 38.6 | 38.5 | 38.25 | 38.25 | 37.25 |
| Bis-phenol A polycarbonate, MFI: 30 | 39.25 | 38.6 | 38.5 | 38.25 | 38.25 | 37.25 |
| potassium diphenyl sulfone sulfonate | | 0.59 | | | | |
| Talc | | 1.8 | 1.8 | 2 | 2 | 4 |
| SAN-encapsulated PTFE (50% PTFE) | 1 | 0.09 | 0.9 | 1 | 1 | 1 |
| pentaerythritol tetrastearate | 0.5 | 0.5 | 0.5 | 0.5 | 0.5 | 0.5 |
| tris(2,4-di-t-butylphenyl)phosphite | | 0.08 | 0.08 | | | |
| Hindered phenol antioxidant | | 0.02 | 0.02 | | | |
| glass fiber | 20 | 20 | 20 | 20 | 20 | 20 |
| UL94 Vertical Burn Property | | | | | | |
| Avg[Log(1st FOT)] | 0.82 | 0.47 | 0.40 | 0.65 | 0.83 | 0.45 |
| StDev[Log(1st FOT)] | 0.40 | 0.28 | 0.39 | 0.33 | 0.29 | 0.26 |

TABLE 3c-continued

20% Glass Fiber reinforced polycarbonate compositions containing talc, no FR agent and statistics for UL94 vertical burn test results

| Generic Raw Material Description | 59 | 60 | 61 | 62 | 63 | 64 |
|---|---|---|---|---|---|---|
| Avg[Log(2nd FOT)] | 0.85 | 1.09 | 0.84 | 0.81 | 0.83 | 0.84 |
| StDev[Log(2nd FOT)] | 0.40 | 0.32 | 0.35 | 0.42 | 0.48 | 0.34 |
| Drips | 0 | 0 | 0 | 0 | 0 | 0 |
| p(FTP) for V-0 | 0.00 | 0.00 | 0.02 | 0.01 | 0.00 | 0.03 |
| p(FTP) for V-1 | 0.56 | 0.55 | 0.83 | 0.74 | 0.58 | 0.87 |

TABLE 3d

20% Glass fiber reinforced polycarbonate compositions containing talc and FR agent and statistics for UL94 vertical burn test results

| Generic Raw Material Description | 65 | 66 | 67 | 68 | 69 | 70 | 71 | 72 | 73 | 74 | 75 | 76 |
|---|---|---|---|---|---|---|---|---|---|---|---|---|
| Bis-phenol A polycarbonate, MFI: 5 | 38.25 | 37.7 | 37.5 | 37.5 | 37.5 | 37.5 | 37.5 | 37.2 | 39 | 38.6 | 38.2 | 37.2 |
| Bis-phenol A polycarbonate, MFI: 30 | 38.25 | 37.7 | 37.5 | 37.5 | 37.5 | 37.5 | 37.5 | 37.2 | 39 | 38.6 | 38.2 | 37.2 |
| potassium diphenyl sulfone sulfonate | | | | | | | | | | 0.59 | 0 | 0 |
| potassium perfluorobutane sulfonate | 0.05 | 0.05 | 0.05 | 0.05 | 0.05 | 0.05 | 0.05 | 0.05 | 0.1 | 0.1 | 0.1 | 0.1 |
| Talc | 2 | 3 | 3 | 3 | 3 | 3 | 3 | 4 | | 1.8 | 2 | 4 |
| SAN-encapsulated PTFE (50% PTFE) | 1 | 1 | 1 | 1 | 1 | 1 | 1 | 1 | 1 | 0.09 | 1 | 1 |
| pentaerythritol tetrastearate | 0.5 | 0.5 | 0.5 | 0.5 | 0.5 | 0.5 | 0.5 | 0.5 | 0.5 | 0.5 | 0.5 | 0.5 |
| tris(2,4-di-t-butylphenyl)phosphite | | | | | | | | | | 0.08 | 0 | 0 |
| Hindered phenol antioxidant | | | | | | | | | | 0.02 | 0 | 0 |
| carbon black | | | 0.5 | 0.5 | 0.5 | 0.5 | 0.5 | | 0.5 | | 0 | 0 |
| glass fiber | 20 | 20 | 20 | 20 | 20 | 20 | 20 | 20 | 20 | 20 | 20 | 20 |
| UL94 Vertical Burn Property | | | | | | | | | | | | |
| Avg[Log(1st FOT)] | 0.29 | 0.09 | 0.07 | 0.04 | 0.11 | 0.04 | 0.01 | 0.16 | 0.22 | 0.47 | 0.25 | 0.09 |
| StDev[Log(1st FOT)] | 0.19 | 0.10 | 0.11 | 0.10 | 0.29 | 0.07 | 0.02 | 0.12 | 0.23 | 0.21 | 0.23 | 0.11 |
| Avg[Log(2nd FOT)] | 0.54 | 0.58 | 0.37 | 0.39 | 0.36 | 0.31 | 0.42 | 0.60 | 0.48 | 0.86 | 0.55 | 0.52 |
| StDev[Log(2nd FOT)] | 0.13 | 0.21 | 0.12 | 0.24 | 0.10 | 0.10 | 0.18 | 0.24 | 0.17 | 0.30 | 0.19 | 0.20 |
| Drips | 0 | 0 | 0 | 0 | 0 | 0 | 0 | 0 | 0 | 0 | 0 | 0 |
| p(FTP) for V-0 | 1.00 | 0.91 | 1.00 | 0.97 | 0.99 | 1.00 | 1.00 | 0.79 | 0.99 | 0.03 | 0.96 | 0.96 |
| | 1.00 | 1.00 | 1.00 | 1.00 | 1.00 | 1.00 | 1.00 | 1.00 | 1.00 | 0.90 | 1.00 | 1.00 |

TABLE 3e

Glass fiber (30% & 40%) reinforced polycarbonate compositions and statistics for UL94 vertical burn test results

| Generic Raw Material Description | 77 | 78 | 79 | 80 | 81 | 82 | 83 | 84 |
|---|---|---|---|---|---|---|---|---|
| Bis-phenol A polycarbonate, MFI: 5 | 34.3 | 33.5 | 33 | 32.5 | 34 | 29 | 28.3 | 28 |
| Bis-phenol A polycarbonate, MFI: 30 | 34.3 | 33.5 | 33 | 32.5 | 34 | 29 | 28.3 | 28 |
| potassium diphenyl sulfone sulfonate | 0.6 | | 0.6 | | | 0.6 | | 0.6 |
| potassium perfluorobutane sulfonate | | | | 0.05 | 0.05 | 0.1 | | 0.05 |
| Talc | 1.8 | 1.8 | 1.8 | 3 | | 1.7 | 1.7 | 1.7 |
| SAN-encapsulated PTFE (50% PTFE) | 1 | 1 | 1 | 1 | 1 | 1 | 1 | 1 |
| pentaerythritol tetrastearate | 0.5 | 0.5 | 0.5 | 0.5 | 0.5 | 0.5 | 0.5 | 0.5 |
| tris(2,4-di-t-butylphenyl)phosphite | 0.08 | 0.08 | 0.08 | | | 0.08 | 0.08 | 0.08 |
| Hindered phenol antioxidant | 0.02 | 0.02 | 0.02 | | | 0.02 | 0.2 | 0.02 |
| carbon black | | | | 0.5 | 0.5 | | | |
| glass fiber | 30 | 30 | 30 | 30 | 30 | 40 | 40 | 40 |
| UL94 Vertical Burn Property | | | | | | | | |
| Avg[Log(1st FOT)] | 0.91 | 0.56 | 0.68 | 0.24 | 0.31 | 1.02 | 0.75 | 1.14 |
| StDev[Log(1st FOT)] | 0.27 | 0.38 | 0.26 | 0.17 | 0.16 | 0.29 | 0.39 | 0.26 |
| Avg[Log(2nd FOT)] | 1.10 | 0.90 | 0.85 | 0.59 | 0.68 | 1.40 | 1.05 | 0.92 |
| StDev[Log(2nd FOT)] | 0.21 | 0.47 | 0.29 | 0.19 | 0.24 | 0.18 | 0.37 | 0.45 |
| Drips | 0 | 0 | 0 | 0 | 0 | 5 | 1 | 2 |
| p(FTP) for V-0 | 0.00 | 0.00 | 0.00 | 0.93 | 0.57 | 0.00 | 0.00 | 0.00 |
| p(FTP) for V-1 | 0.76 | 0.54 | 0.93 | 1.00 | 1.00 | 0.09 | 0.43 | 0.33 |

What is claimed is:

1. A composition consisting essentially of a polycarbonate resin and an effective flame-retardant amount of a combination of a perfluoroalkane sulfonate flame retardant material and talc;
wherein the resin composition has a flame rating of V-0 in the Underwriter's laboratory UL-94 protocol when measured on a test specimen of about 0.062 inch by about 0.5 inch by about 5 inch dimensions.

2. The composition according to claim 1, wherein the talc is present in an amount effective to render the resin composition a flame rating of V-0 in the Underwriter's laboratory UL-94 protocol when measured on a test specimen of about 0.062 inch by about 0.5 inch by about 5 inch dimensions.

3. The composition of claim 1, wherein the perfluoroalkane sulfonate is present in an amount effective to render the resin composition a flame rating of V-0 in the Underwriter's laboratory UL-94 protocol when measured on a test specimen of about 0.062 inch by about 0.5 inch by about 5 inch dimensions.

4. The composition according to claim 1, wherein the perfluoroalkane sulfonate is potassium perfluorobutane sulfonate.

5. The composition according to claim 3, wherein the talc alone is present in an amount effective to render the resin composition a flame rating of V-0 in the Underwriter's laboratory UL-94 protocol when measured on a test specimen of about 0.062 inch by about 0.5 inch by about 5 inch dimensions.

6. The composition according to claim 1, wherein the perfluoroalkane sulfonate is present in an amount of 0.05 to 5 parts by weight and the talc is present in an amount of about 0.05 to 10 parts by weight.

7. The composition according to claim 1, further comprising at least a reinforcing fiber.

8. The composition according to claim 7, wherein the reinforcing fiber is present in an amount of up to 30 parts by weight.

9. The composition according to claim 7, wherein the reinforcing fiber is present in an amount of up to 20 parts by weight.

10. The composition according to claim 7, wherein the reinforcing fiber is present in an amount of up to 10 parts by weight.

11. The composition according to claim 7, wherein the reinforcing fiber is selected from glass fibers, carbon fibers, or combinations thereof.

12. An article comprising the composition of claim 1.

13. A method for making a fire-retarded polycarbonate resin composition comprising the steps of compounding the resin with an effective flame-retardant amount of a perfluoroalkane sulfonate flame retardant component and talc;
wherein the composition consists essentially of the polycarbonate resin, the perfluoroalkane sulfonate flame retardant and the talc;
wherein the resin composition has a flame rating of V-0 in the Underwriter's laboratory UL-94 protocol when measured on a test specimen of about 0.062 inch by about 0.5 inch by about 5 inch dimensions.

14. The method according to claim 13, wherein the talc alone is present in an amount effective to render the resin composition a flame rating of V-0 or V-1 in the Underwriter's laboratory UL-94 protocol when measured on a test specimen of about 0.062 inch by about 0.5 inch by about 5 inch dimensions.

15. The method according to claim 14, wherein the talc alone is present in an amount effective to render the resin composition a flame rating of V-0 in the Underwriter's laboratory UL-94 protocol when measured on a test specimen of about 0.062 inch by about 0.5 inch by about 5 inch dimensions.

16. The method according to claim 13, wherein the perfluoroalkane sulfonate is present in an amount effective to render the resin composition a flame rating of V-0 or V-1 in the Underwriter's laboratory UL-94 protocol when measured on a test specimen of about 0.062 inch by about 0.5 inch by about 5 inch dimensions.

17. The method according to claim 16, wherein the perfluoroalkane sulfonate is present in an amount effective to render the resin composition a flame rating of V-0 in the Underwriter's laboratory UL-94 protocol when measured on a test specimen of about 0.062 inch by about 0.5 inch by about 5 inch dimensions.

18. The method according to claim 13, wherein the perfluoroalkane sulfonate is present in an amount of 0.1 to 5 parts by weight and the talc is present in an amount of about 0.1 to 10 parts by weight.

19. A method to increase the flame retardant property of a polycarbonate composition containing an amount of at least a perfluoroalkane sulfonate flame retardant component, to render the composition a flame rating of at least V-0 in the Underwriter's Laboratory UL-94 protocol when measured on a test specimen of about 0.062 inch by about 0.5 inch by about 5 inch dimensions,
said method comprises blending into said composition an effective flame-retardant amount talc;
wherein the polycarbonate composition consists essentially of the polycarbonate resin, the perfluoroalkane sulfonate flame retardant and the talc.

20. The method of claim 19, wherein said effective flame-retardant amount of talc is in an amount of about 0.1 to 10 parts by weight.

21. The method of claim 19, wherein said perfluoroalkane sulfonate is present in an amount of 0.1 to 5 parts by weight.

22. A composition comprising a polycarbonate resin and an effective flame-retardant amount of a combination of a flame retardant material and talc;
wherein the polycarbonate resin comprises a mixture of linear and branched polycarbonates.

* * * * *